(12) United States Patent
Elomari (10) Patent No.: US 9,822,012 B2
(45) Date of Patent: Nov. 21, 2017

(54) MOLECULAR SIEVE AL-SSZ-63 COMPOSITION OF MATTER AND SYNTHESIS THEREOF

(71) Applicant: Chevron U.S.A. Inc., San Ramon, CA (US)

(72) Inventor: Saleh Ali Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 99 days.

(21) Appl. No.: 15/096,830

(22) Filed: Apr. 12, 2016

(65) Prior Publication Data

US 2017/0291822 A1    Oct. 12, 2017

(51) Int. Cl.
    *C01B 39/48*    (2006.01)
    *B01J 29/70*    (2006.01)
    *B01J 37/00*    (2006.01)

(52) U.S. Cl.
    CPC ........... *C01B 39/48* (2013.01); *B01J 29/70* (2013.01); *B01J 29/7007* (2013.01); *B01J 37/0018* (2013.01)

(58) Field of Classification Search
    CPC ........ C01B 39/48; B01J 29/7007; B01J 29/70
    See application file for complete search history.

(56) References Cited

U.S. PATENT DOCUMENTS

| | | | |
|---|---|---|---|
| 3,140,249 A | 7/1964 | Plank et al. | |
| 3,140,251 A | 7/1964 | Plank et al. | |
| 3,140,253 A | 7/1964 | Plank et al. | |
| 4,559,315 A | 12/1985 | Chang et al. | |
| 4,910,006 A | 5/1990 | Zones et al. | |
| 5,316,753 A | 5/1994 | Nakagawa | |
| 6,733,742 B1 | 5/2004 | Elomari | |
| 2004/0124123 A1* | 7/2004 | Elomari | B01J 23/44 208/111.01 |
| 2004/0127346 A1* | 7/2004 | Elomari | B01D 53/9418 502/60 |

OTHER PUBLICATIONS

Burton et al., "Structure and Synthesis of SSZ-63: Toward an Ordered Form of Zeolite Beta", J. Phys. Chem. B 2005, 109, pp. 20266-20275.
Higgins et al, "The framework Topology of Zeolite Beta", Zeolites, 1988, vol. 8, pp. 446-452.
Higgins et al., "The Framework Topology of Zeolite beta—A Correction", Zeolites, 1989, vol. 9, p. 358.

* cited by examiner

*Primary Examiner* — David M Brunsman
(74) *Attorney, Agent, or Firm* — E. Joseph Gess; Terrence M. Flaherty; Melissa M. Hayworth (57) ABSTRACT

Described herein is a new crystalline molecular sieve Al-SSZ-63 prepared by a direct synthesis. The synthesis uses N-cyclodecyl-N-methyl-pyrrolidinium cation as a structure-directing agent. A method for directly synthesizing the Al-SSZ-63 is also provided, as are processes employing the Al-SSZ-63 in a catalyst.

12 Claims, 4 Drawing Sheets

FIGURE 4

MOLECULAR SIEVE AL-SSZ-63 COMPOSITION OF MATTER AND SYNTHESIS THEREOF

FIELD OF ART

Disclosed herein is a new crystalline molecular sieve Al-SS2-63, a method for preparing the Al-SS2-63 using N-cyclodecyl-N-methyl-pyrrolidinium cation as a structure directing agent and the use of the Al-SS2-63 in catalysis for, e.g., hydrocarbon conversion reactions.

BACKGROUND

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SSZ-63 is known and is disclosed in U.S. Pat. No. 6,733,742. The SSZ-63 is synthesized in U.S. Pat. No. 6,733,742 using 1-cyclodecyl-1-methylpyrrolidinium cation as the structure directing agent (SDA). The examples in the patent disclose the synthesis of aluminosilicate SSZ-63 (Al-SS2-63) by post-treatment of borosilicate SSZ-63 with aluminum nitrate.

Burton et al., "Structure and Synthesis of SSZ-63: Toward an Ordered Form of Zeolite Beta", J. Phys. Chem. B 2005, 109, pp 20266-20275, discloses that the presence of boron is required for the formation of SSZ-63 in synthesis gels using 1-cyclodecyl-1-methylpyrrolidinium cation as the SDA.

Preparing an Al-SSZ-63 zeolite by a more direct process would be of great benefit to the catalytic industry.

SUMMARY

Disclosed herein is one member of a family of crystalline molecular sieves with unique properties, referred to herein as "molecular sieve SSZ-63" or simply "SSZ-63". That family member is SSZ-63 obtained in its aluminosilicate form. As used herein, the term "aluminosilicate" refers to a molecular sieve containing both alumina and silica. Formation of the Al form of SSZ-63, i.e., Al-SSZ-63 is the ultimate goal. Provided herein is a direct process for preparing Al-SSZ-63.

Figure 1:
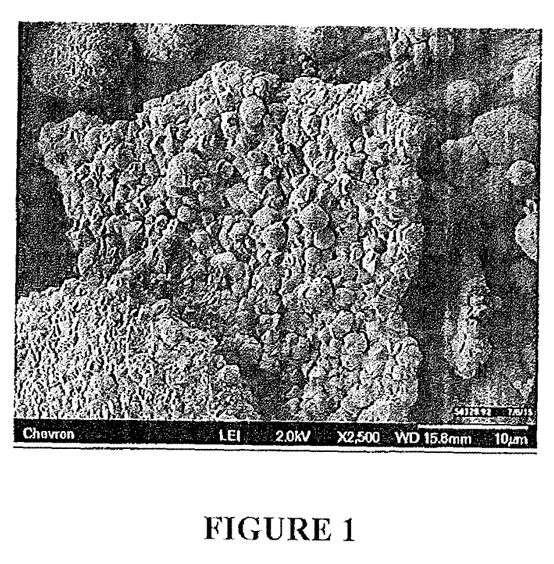
FIG. 1 is an SEM of the calcined material prepared by Example 2, showing an unique morphology.

In accordance with one embodiment, there is provided a molecular sieve having a mole ratio greater than about 15 of (1) silicon oxide to (2) an oxide of aluminum having, after calcination, the X-ray diffraction lines of Table IV. In one embodiment, the molecular sieve has a morphology as shown in FIG. 1.

In one embodiment, the molecular sieve has a composition, as synthesized and in the anhydrous state, in terms of mole ratios as follows:

$SiO_2/Al_2O_3$ 15-100

$M_{2/n}/SiO_2$ 0.01-0.03

$Q/SiO_2$ 0.02-0.05.

wherein M is an alkali metal cation, alkaline earth metal cation or mixtures thereof; n is the valence of M (i.e., 1 or 2); and Q is N-cyclodecyl-N-methyl-pyrrolidinium cation.

In accordance with one embodiment, there is also provided a molecular sieve prepared by thermally treating a zeolite having a mole ratio of a silicon oxide to an aluminum oxide greater than about 15 at a temperature of from about 200° C. to about 800° C., the thus-prepared zeolite having the X-ray diffraction lines of Table IV. This thus-prepared molecular sieve is predominantly, i.e., mostly, in the hydrogen form, which hydrogen form is prepared by ion exchanging with an acid or with a solution of an ammonium salt followed by a second calcination.

Also provided in one embodiment is a method of preparing a crystalline material comprising contacting under crystallization conditions sources of fumed silicon oxide and sources of aluminum oxide selected from Reheis F-2000 or Y zeolite, and a structure directing agent comprising N-cyclodecyl-N-methyl-pyrrolidinium cation. The method can be used to synthesize crystalline materials having, after calcination, the X-ray diffraction lines of Table IV, as well as the morphology show in FIG. 1.

Among other factors, provided is a direct synthesis of a novel Al-SSZ-63, which synthesis was found surprising based upon the prior art. The synthesis allows one to obtain an Al-SSZ-63 zeolite having a different morphology than the prior art. The Al-SSZ-63 prepared by the present direct process has also been found to be more active as a catalyst in hydroprocessing than an Al-SSZ-63 zeolite obtained through the prior art boron pathway. The present direct process is a more economical process by eliminating the need for boron, yet provides an unique Al-SSZ-63 exhibiting excellent properties.

DETAILED DESCRIPTION

Disclosed herein is a family of crystalline, large pore molecular sieves designated herein "molecular sieve SSZ-63" or simply "SSZ-63". As used herein, the term "large pore" means having an average pore size diameter greater than about 6.0 Angstroms, preferably from about 6.5 Angstroms to about 7.5 Angstroms.

While not wishing to be bound by any theory, it is believed that the crystal structure of SSZ-63 consists of two polymorphs of zeolite beta. Typical zeolite beta (BEA*) has a crystal structure consisting of about a 50/50 combination of two polymorphs, polymorph A and polymorph B. It is believed that the crystal structure of SSZ-63 consists of about 60-70% of a beta polymorph referred to herein as beta-C(Higgins) with the remainder being beta polymorph B. Beta polymorph C (Higgins) is different from beta polymorph C. The structure of polymorph C (Higgins) has been postulated in the literature, but it is believed that polymorph C (Higgins) has heretofore not been made. A discussion of polymorph C (Higgins) can be found in Higgins et al, "The framework Topology of Zeolite Beta", Zeolites, 1988, vol. 8, pp. 446-452, with a correction at Higgins et al., "The Framework Topology of Zeolite Beta—A Correction", Zeolites, 1989, vol. 9, p. 358.

Further disclosed herein is a direct method of preparing Al-SSZ-63. In preparing Al-SSZ-63, N-cyclodecyl-N-methyl-pyrrolidinium cation is used as a structure directing agent ("SDA"), also known as a crystallization template. In general, the present Al-SSZ-63 is prepared by contacting fumed silica, i.e., a specific active source of silicon oxide with an aluminum oxide source with the N-cyclodecyl-N-methyl-pyrrolidinium cation SDA.

Al-SSZ-63 is prepared from a reaction mixture having the composition shown in Table I below.

TABLE I

| Reaction Mixture | Mixture Ranges | |
|---|---|---|
| | Typical | Preferred |
| $SiO_2/Al_2O_3$ | 15-100 | 25-45 |
| $OH^-/SiO_2$ | 0.10-0.50 | 0.20-0.30 |
| $Q/SiO_2$ | 0.05-0.50 | 0.10-0.20 |
| $M_{2/n}/SiO_2$ | 0.02-0.40 | 0.10-0.25 |
| $H_2O/SiO_2$ | 30-80 | 35-45 | where Q, M and n are as defined above.

In practice, Al-SSZ-63 is prepared by a process comprising:

(a) preparing an aqueous solution containing sources of fumed silicon oxide and an aluminum oxide source selected from Rehies-2000 or Y zeolite; and a N-cyclodecyl-N-methyl-pyrrolidinium cation having an anionic counterion which is not detrimental to the formation of Al-SSZ-63;

(b) maintaining the aqueous solution under conditions sufficient to form crystals of Al-SSZ-63; and (c) recovering the crystals of Al-SSZ-63.

Accordingly, the Al-SSZ-63 may comprise the crystalline material and the SDA in combination with metallic and non-metallic oxides bonded in tetrahedral coordination through shared oxygen atoms to form a cross-linked three dimensional crystal structure. The metallic and non-metallic oxides comprise silicon oxide and aluminum oxide.

Sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. In one embodiment, it has been found for the present direct process, that the aluminum oxide source comprises Y zeolite or an aluminum hydroxide gel. Reheis F-2000 is a suitable commercial source of aluminum hydroxide gel. The aluminum hydroxide gel is generally used in the dried state.

For the present process, a fumed silica has been found to be the necessary source of silicon oxide. The use of such a silicon source has surprisingly been found to allow Al-SSZ-63 to be prepared directly without having to use the boron pathway demanded by the prior art. Such fumed silica sources are commercially available, e.g., as CAB-O-SIL® M-5.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The SDA may be used to provide hydroxide ion. Thus, it may be beneficial to ion exchange, for example, the halide to hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the Al-SSZ-63 are formed. The hydrothermal crystallization is usually conducted under autogenous pressure, at a temperature between 100° C. and 200° C., preferably between 135° C. and 160° C. The crystallization period is typically greater than 1 day, and preferably from about 3 days to about 20 days.

Preferably, the molecular sieve is prepared using mild stirring or agitation.

During the hydrothermal crystallization step, the Al-SSZ-63 crystals can be allowed to nucleate spontaneously from the reaction mixture. The use of Al-SSZ-63 crystals as seed material can be advantageous in decreasing the time necessary for complete crystallization to occur. In addition, seeding can lead to an increased purity of the product obtained by promoting the nucleation and/or formation of Al-SSZ-63 over any undesired phases. When used as seeds, Al-SSZ-63 crystals are added in an amount between 0.1 and 10% of the weight of silica used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized Al-SSZ-63 crystals. The drying step can be performed at atmospheric pressure or under vacuum.

Al-SSZ-63 as prepared by the present direct process has a mole ratio of silicon oxide to aluminum oxide greater than about 15 but generally in the range of 15-100; and has, after calcination, the X-ray diffraction lines of Table IV below. Al-SSZ-63 further has a composition, as synthesized (i.e., prior to removal of the SDA from the Al-SSZ-63) and in the anhydrous state, in terms of mole ratios, shown in Table II below.

TABLE II

| As Synthesized Al-SSZ-63 | |
|---|---|
| $SiO_2/Al_2O_3$ | 15-100 |
| $M_{2/n}/SiO_2$ | 0.01-0.03 |
| $Q/SiO_2$ | 0.02-0.05 | where M, n and Q are as defined above. A method of increasing the mole ratio of silica to alumina is by using standard acid leaching or chelating treatments.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that Al-SSZ-63 prepared by the present direct process is comprised of a new framework structure or topology which is characterized by its X-ray diffraction pattern. The Al-SSZ-63, as-synthesized, has a crystalline structure whose X-ray powder diffraction pattern exhibit the characteristic lines shown in Table III and is thereby distinguished from other molecular sieves.

Table III below shows the X-ray powder diffraction lines for as-synthesized Al-SSZ-63, prepared by the present direct process, including actual relative intensities.

TABLE III

| 2 Theta[a] | d-spacing (Angstroms) | Relative Intensity (%) |
|---|---|---|
| 7.18 | 12.30 | 24.6 (M) |
| 7.74 | 11.41 | 57.4 (S) |
| 10.50 | 8.42 | 1.2 (W) |
| 12.04 | 7.35 | 1.8 (W) |
| 13.33 | 6.65 | 1.1 (W) |
| 21.384 | 4.15 | 19.4 (M) |
| 22.46 | 3.96 | 100.0 (VS) |
| 25.34 | 3.51 | 7.0 (W |
| 26.07 | 3.41 | 0.9 (W) |
| 26.98 | 3.30 | 6.3 (W) |
| 28.80 | 3.1 | 3.7 (W) |
| 29.56 | 3.02 | 6.0 (W) |
| 30.44 | 2.93 | 3.1 (W) |
| 33.42 | 2.68 | 9.5 (W) |
| 34.70 | 2.58 | 0.9 (W) |
| 36.24 | 2.48 | 1.1 (W) |

[a]±0.20

The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

After calcination, the Al-SSZ-63 molecular sieves prepared by the present process have a crystalline structure whose X-ray powder diffraction pattern include the characteristic lines shown in Table IV, including actual relative intensities.

TABLE IV

| Calcined Al-SSZ 63 | | |
|---|---|---|
| 2 Theta[a] | d-spacing (Angstroms) | Relative Intensity (%) |
| 7.26 | 12.16 | 35.4 (M) |
| 7.84 | 11.26 | 100.0 (VS) |
| 13.45 | 6.56 | 2.9 (W) |
| 14.60 | 6.06 | 4.8 (W) |
| 21.40 | 4.15 | 17.2 (W) |
| 22.48 | 3.95 | 85.8 (VS) |
| 25.40 | 3.50 | 8.0 (W) |
| 27.10 | 3.29 | 4.8 (W) |
| 28.80 | 3.1 | 5.0 (W) |
| 29.66 | 3.01 | 4.1 (W) |
| 30.48 | 2.93 | 3.1 (W) |
| 33.38 | 2.68 | 3.4 (W) |
| 36.08 | 2.49 | 2.0 (W) |

[a]±0.20

The X-ray powder diffraction patterns were determined by standard techniques. The radiation was the IC-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.20 degrees.

The X-ray diffraction pattern of Table III is representative of "as-synthesized" or "as-made" Al-SSZ-63 molecular sieves prepared by the present direct process. Minor variations in the diffraction pattern can result from variations in the silica-to-alumina mole ratio of the particular sample due to changes in lattice constants. In addition, sufficiently small crystals will affect the shape and intensity of peaks, leading to significant peak broadening.

Representative peaks from the X-ray diffraction pattern of calcined Al-SSZ-63 are shown in Table IV. Calcination can also result in changes in the intensities of the peaks as compared to patterns of the "as-made" material, as well as minor shifts in the diffraction pattern. The molecular sieve produced by exchanging the metal or other cations present in the molecular sieve with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Figure 2:
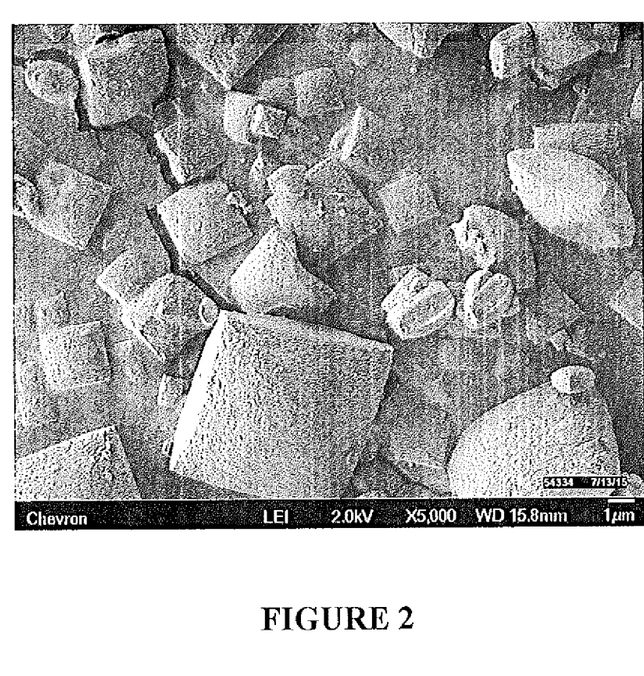
FIG. 2 is on SEM of the Al-SSZ-63 prepared according to Example 3 of U.S. Pat. No. 6,733,742, using the prior art boron pathway.

The Al-SSZ-63 prepared by the present direct process also has a unique morphology which is vastly different from the Al-SSZ-63 prepared using the boron pathway of the prior art. The Al-SSZ-63 derived using the boron pathway has a crystal morphology that looks like charcoal briquettes with crystal sizes from 1 micrometer to 4 micrometers, and even larger. See, FIG. 2 of the Drawing. The crystal morphology of the Al-SSZ-63 prepared by the present direct synthesis is no longer charcoal briquettes-like, but appears as terraced ball-like and in some cases as terraced cubes with a much smaller crystal size. See, FIG. 1 of the Drawing.

Crystalline Al-SSZ-63 can be used as-synthesized, but preferably will be thermally treated (calcined). The calcination is a typical calcination and is generally done in air, not nitrogen. For example, the calcination process can comprise elevating the temperature of the Al-SSZ-63 by 1° C./minute up to 120° C., and then holding for two hours at 120° C. The temperature is then ramped by 1° C./minute up to 540° C. and held there for 300 minutes. The temperature is then again ramped at a rate of 1° C./minute to 595° C. and held there for 300 minutes to complete the calcination.

Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Metals may also be introduced into the molecular sieve by replacing some of the cations in the molecular sieve with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the Al-SSZ-63. The Al-SSZ-63 can also be impregnated with the metals, or the metals can be physically and intimately admixed with the Al-SSZ-63 using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the molecular sieve is typically washed with water and dried at temperatures ranging from 65° C. to about 200° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

The Al-SSZ-63 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-63 can be extruded before drying, or, dried or partially dried and then extruded.

The present Al-SSZ-63 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

The present Al-SSZ-63 is useful in catalysts for a variety of hydrocarbon conversion reactions such as hydrocracking, dewaxing, isomerization and the like. The Al-SSZ-63 prepared by the present direct process does provide better activity than Al-SSZ-63 prepared by the boron pathway. The differences exhibited in XRD and morphology seem to make a difference in activity. The present Al-SSZ-63 can be used in catalysis and offers even better activity. In theory, it is possible that the location of the Al atoms in the crystalline structure may be in different locations than that of an Al-SSZ-63 prepared by the boron pathway.

The Al-SSZ-63 prepared by the present direct process therefore offers the benefits of a more economically effective synthesis of Al-SSZ-63 as the steps of after synthesis treatment to convert the non-active boron phase to the active aluminum phase by boiling with aluminum nitrate or other aluminum introducing agents are eliminated. Benefits of greater activity are also believed realized, which increases the benefits offered by the Al-SSZ-63 prepared by the present direct process.

EXAMPLES

The following examples are provided as specific illustrations, and are not meant to be limiting.

Example 1

Synthesis of the Structure-Directing Agent A
(N-cyclodecyl-N-methyl-pyrrolidinium Cation)

Structure Directing Agent

The anion (X⁻) associated with the cation may be any anion which is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

The structure-directing agent (SDA) N-cyclodecyl-N-methyl-pyrrolidinium cation was synthesized according to the procedure described below (see Scheme 1). To a solution of cyclodecanone (25 gm; 0.16 mol) in 320 ml anhydrous hexane in a three-necked round bottom flask equipped with a reflux condenser and a mechanical stirrer, 34 gm of pyrrolidine (0.48 mol) and 48 gm (0.4 mol) anhydrous magnesium sulfate were added. The resulting mixture was stirred while heating at reflux for five days. The reaction mixture was filtered through a fritted-glass funnel. The filtrate was concentrated at reduced pressure on a rotary evaporator to yield 32 gm (96%) of the expected enamine (1-cyclodec-1-enyl-pyrrolidine) as a reddish oily substance. $^1$H NMR and $^{13}$C-NMR spectra were acceptable for the desired product. The enamine was reduced to the corresponding amine (N-cyclodecyl-pyrrolidine) in quantitative yield via catalytic hydrogenation in the presence of 10% Pd on activated carbon at hydrogen pressure of 55 PSI in ethanol.

Quaternization of N-cyclodecyl-pyrrolidine with
Methyl Iodide (Synthesis of
N-cyclodecyl-N-methyl-pyrrolidinium Iodide)

To a solution of 30 gm (0.14 mol.) of N-cyclodecyl-pyrrolidine in 250 ml anhydrous methanol in a one liter reaction flask, 30 gm (0.21 mol.) of methyl iodide was added. The reaction mixture was mechanically stirred for 48 hours at room temperature. Then, a 0.5 mole equivalent of methyl iodide was added and the mixture was heated to reflux and refluxed for 30 minutes. The reaction mixture was then cooled down and concentrated under reduced pressure on a rotary evaporator to give the product as a pale yellow solid material. The product was purified by dissolving in acetone and then precipitating by adding diethyl ether. The recrystallization yielded 46 gm (93%) of the pure N-cyclodecyl-N-methyl-pyrrolidinium iodide. $^{1}$H-NMR and $^{13}$C-NMR were ideal for the product.

Ion Exchange (Synthesis of N-cyclodecyl-N-methyl-pyrrolidinium Hydroxide)

N-cyclodecyl-N-methyl-pyrrolidinium iodide (45 gm; 0.128 mol) was dissolved in 150 ml water in a 500 ml plastic bottle. To the solution, 160 gm of Ion-Exchange Resin-OH (BIO RAD® AH1-X8) was added and the mixture was stirred at room temperature overnight. The mixture was filtered and the solids were rinsed with an additional 85 ml of water. The reaction afforded 0.12 mole of the SDA (N-cyclodecyl-N-methyl-pyrrolidinium hydroxide) as indicated by titration analysis with 0.1N HCl.

Scheme 1

Example 2

Direct Synthesis of Aluminosilicate SSZ-63

Figure 3:
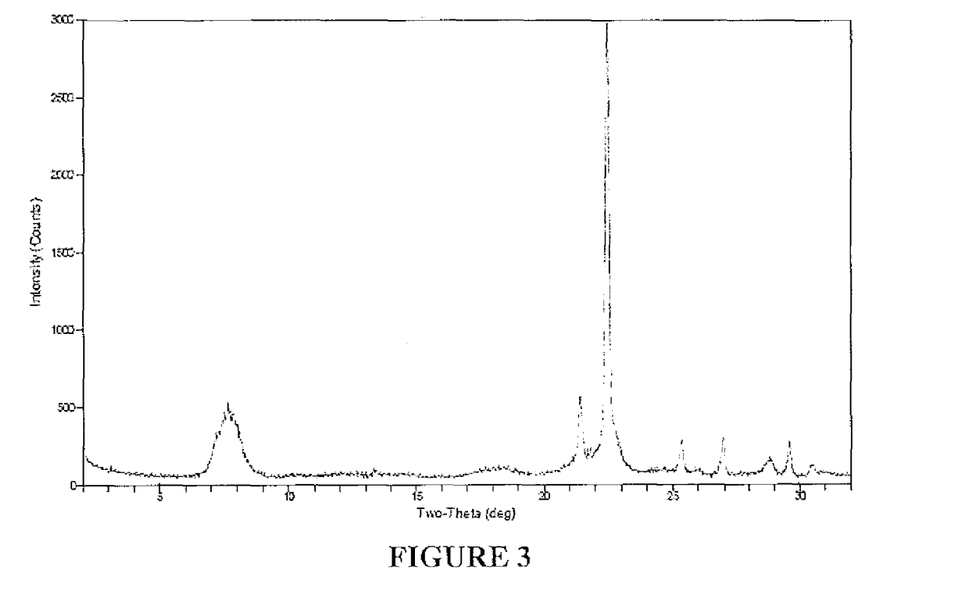
FIG. 3 is a powder X-ray diffraction pattern of the as-made Al-SS2-63 from Example 2.
Figure 4:
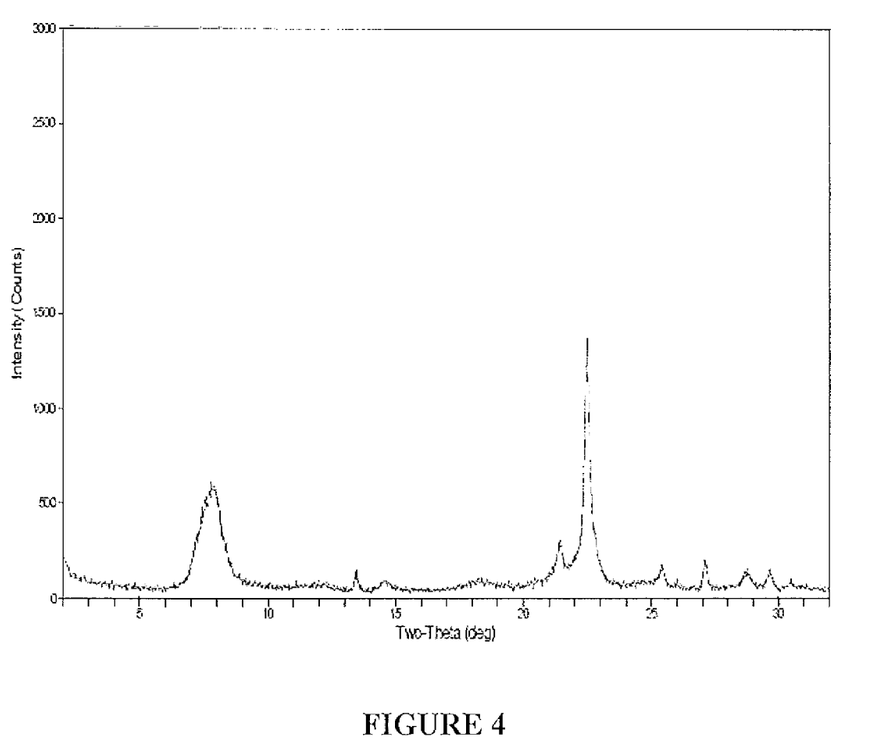
FIG. 4 is a powder X-ray diffraction pattern of the calcined Al-SS2-63 from Example 2.

A 23 cc Teflon liner was charged with 3.7 gm of 0.61M aqueous solution of N-cyclodecyl-N-methyl-pyrrolidinium hydroxide (2.25 mmol SDA), 1.5 gm of 1M aqueous solution of NaOH (1.5 mmol NaOH) and 6.5 gm of de-ionized water. To this mixture, 0.033 gm of Reheis F-2000 were added as aluminum oxide source and stirred until all dissolved. Then, 0.91 gm of CAB-O-SIL® M-5 (~14.7 mmol SiO$_2$) was added and thoroughly stirred by hand until smooth homogenous mixture was obtained. The resulting gel was capped off and placed in a Parr steel autoclave and heated in an oven at about 160° C. while tumbling at around 43 rpm. The reaction was followed by periodically monitoring the pH of the gel, and by looking for crystal growth using scanning electron microscopy (SEM). Once the crystallization was completed, after heating for 8-10 days at the conditions described above, the starting reaction gel turned into clear liquid layer and a fine powdery precipitate. The mixture was filtered through a fritted-glass funnel. The collected solids were thoroughly washed with water and, then, rinsed with acetone (~20 ml) to remove any organic residues. The solids were allowed to air-dry overnight and, then, dried in an oven at 120° C. for 1 hr. The reaction afforded 0.88 gram of Al-SSZ-63 as determined from its unique XRD pattern, and by transmission electron microscopy analysis SEM. The XRD of the as-made material is shown in FIG. 3. After calcination, the SEM of the calcined material is shown in FIG. 1, and the XRD of calcined material is shown in FIG. 4.

Example 3

Direct Al-SSZ-63 Zeolite Using Na—Y Zeolite as Aluminum Source

A 23 cc Teflon liner was charged with 3.7 gm of 0.61M aqueous solution of N-cyclodecyl-N-methyl-pyrrolidinium hydroxide (2.25 mmol SDA), 1.5 gm of 1M aqueous solution of NaOH (1.5 mmol NaOH) and 2.4 gm of de-ionized water. To this mixture, 0.25 gm of Na—Y zeolite as the aluminum oxide source) and 0.91 gm of CAB-O-SIL® M-5 (~14.7 mmol SiO$_2$) were added and thoroughly stirred by hand until smooth homogenous gel was obtained. The resulting gel was capped off and placed in a Parr steel autoclave and heated in an oven at about 160° C. while tumbling at around 43 rpm. The reaction was surveyed by periodically monitoring the pH of the gel, and by looking for crystal growth using scanning electron microscopy (SEM). Once the crystallization was completed, after heating for 12 days at the conditions described above, the starting reaction gel turned into a clear liquid layer and a fine powdery precipitate. The mixture was filtered through a fritted-glass funnel. The collected solids were thoroughly washed with water and, then, rinsed with acetone (~20 ml) to remove any organic residues. The solids were allowed to air-dry overnight and, then, dried in an oven at 120° C. for 1 hr. The reaction afforded 0.84 gram of Al-SSZ-63 as determined from its unique XRD pattern.

What is claimed is:

1. A molecular sieve having a mole ratio greater than about 15 of (a) a silicon oxide obtained from fumed silica to (b) an aluminum oxide and having, after calcination, the X-ray diffraction lines of the following table:

| 2 Theta (±0.20) | Relative Intensity |
|---|---|
| 7.26 | M |
| 7.84 | VS |
| 13.45 | M |
| 14.60 | W |
| 21.40 | W |
| 22.48 | VS |
| 25.40 | W |
| 27.10 | M |
| 28.80 | W |
| 29.66 | W |
| 30.48 | W |
| 33.48 | W |
| 36.08 | W. |

2. The molecular sieve of claim 1, wherein the aluminum oxide source comprises a Y zeolite or an aluminum hydroxide gel.

3. The molecular sieve of claim 2, wherein the aluminum oxide comprises a Y zeolite.

4. The molecular sieve of claim 2, wherein the aluminum oxide comprises a dried aluminum hydroxide gel.

5. A molecular sieve according to claim 2, wherein said molecular sieve is predominantly in the hydrogen form.

6. A molecular sieve according to claim 2, wherein said molecular sieve is substantially free of acidity.

7. A molecular sieve according to claim 1, wherein said molecular sieve is predominantly in the hydrogen form.

8. A molecular sieve according to claim 1, wherein said molecular sieve is substantially free of acidity.

9. The molecular sieve of claim 1 having a composition, as synthesized and in the anhydrous state, in terms of mole ratios as follows:

SiO$_2$/Al$_2$O$_3$ 15-100

M$_{2/n}$/SiO$_2$ 0.01-0.03

Q/SiO$_2$ 0.02-0.05 wherein M is an alkali metal cation, alkaline earth metal cation or mixtures thereof; n is the valence of M; and Q is a N-cyclodecyl-N-methyl-pyrrolidinium cation.

10. A method of preparing a crystalline material comprising (a) a silicon oxide and (b) an aluminum oxide having a mole ratio of the silicon oxide to the aluminum oxide greater than 15, said method comprising contacting under crystallization conditions sources of said oxides and a structure directing agent comprising a N-cyclodecyl-N-methyl-pyrrolidinium cation, wherein the source of the silicon oxide comprises fumed silica, said crystalline material having, after calcination, the X-ray diffraction lines of the following table:

| 2 Theta (±0.20) | Relative Intensity |
| --- | --- |
| 7.26 | M |
| 7.84 | VS |
| 13.45 | M |
| 14.60 | W |
| 21.40 | W |
| 22.48 | VS |
| 25.40 | W |
| 27.10 | M |
| 28.80 | W |
| 29.66 | W |
| 30.48 | W |
| 33.48 | W |
| 36.08 | W. |

11. The method of claim 10, wherein the aluminum oxide source comprises a Y zeolite or an aluminum oxide gel.

12. The method of claim 10, wherein the aluminum oxide source comprises a Y zeolite.

* * * * *